US012744009B2

(12) United States Patent
Park

(10) Patent No.: US 12,744,009 B2
(45) Date of Patent: Sep. 22, 2026

(54) DATA DRIVING CIRCUIT AND DISPLAY DEVICE

(71) Applicant: LG DISPLAY CO., LTD., Seoul (KR)

(72) Inventor: Yongjin Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/320,753

(22) Filed: Sep. 5, 2025

(65) Prior Publication Data

US 2026/0148702 A1 May 28, 2026

(30) Foreign Application Priority Data

Nov. 26, 2024 (KR) ........................ 10-2024-0171275

(51) Int. Cl.
*G09G 3/3291* (2016.01)
*G09G 3/32* (2016.01)

(52) U.S. Cl.
CPC ............. *G09G 3/3291* (2013.01); *G09G 3/32* (2013.01); *G09G 2310/027* (2013.01); *G09G 2310/0275* (2013.01); *G09G 2310/0291* (2013.01); *G09G 2310/0297* (2013.01); *G09G 2310/08* (2013.01); *G09G 2330/025* (2013.01)

(58) Field of Classification Search
None
See application file for complete search history.

(56) References Cited

U.S. PATENT DOCUMENTS

2019/0189061 A1* 6/2019 Ryu ..................... G09G 3/3426
2025/0384802 A1* 12/2025 Lee .......................... G09G 3/20

FOREIGN PATENT DOCUMENTS

KR 10-2621980 B1 1/2024
KR 10-2024-0107764 A 7/2024

* cited by examiner

*Primary Examiner* — Nicholas J Lee
(74) *Attorney, Agent, or Firm* — Birch, Stewart, Kolasch & Birch, LLP

(57) ABSTRACT

A data driver circuit and a display device are discussed, which are capable of reducing peak current and improving ground bouncing by optimizing a spread time of a MUX stage based on the counted bit toggle value of the image data. The display device can include a display panel in which a plurality of gate lines, a plurality of data lines, a plurality of sub-pixels, and a demultiplexer are disposed; a data driver circuit that supplies a data voltage corresponding to image data to a plurality of data channels; and a controller that controls the data driver circuit and supplies the image data to the data driver circuit. The demultiplexer includes a plurality of MUX stages and controls connection between the plurality of data channels and the plurality of data lines through switching operations of the plurality of MUX stages.

18 Claims, 12 Drawing Sheets

DATA DRIVING CIRCUIT AND DISPLAY DEVICE

CROSS-REFERENCE TO RELATED APPLICATION

This application claims priority to Korean Patent Application No. 10-2024-0171275, filed in the Republic of Korea on Nov. 26, 2024, which is hereby expressly incorporated by reference for all purposes as if fully set forth herein into the present application.

BACKGROUND

Technical Field

Embodiments of the present disclosure relate to an apparatus and particularly to, for example, without limitation, a data driver circuit and a display device including the same.

Discussion of the Related Art

As the information society advances, various demands for display devices that display images are increasing. Accordingly, various types of display devices, such as liquid crystal displays (LCD) and organic light-emitting displays (OLED), are being utilized.

Among the display devices, an organic light-emitting display uses a self-emitting organic light-emitting diode, and thus has advantages in response speed, contrast ratio, light-emission efficiency, luminance, and viewing angle.

Such display devices can place a plurality of multiplexers between data channels and data lines in order to reduce the number of data channels and satisfy a setting time.

The description provided in the discussion of the related art section should not be assumed to be prior art merely because it is mentioned in or associated with that section. The discussion of the related art section may include information that describes one or more aspects of the subject technology, and the description in this section does not limit the disclosure.

SUMMARY OF THE DISCLOSURE

The inventors of the present disclosure have recognized that the use of a plurality of multiplexers can increase the amount of bit toggles, which in turn can increase the amount of peak current toggled by the multiplexers, thereby causing ground bouncing.

Embodiments of the present disclosure can provide a data driver circuit and a display device capable of reducing/preventing peak current and improving ground bouncing by controlling a spread time of multiplexer (MUX) stages.

Embodiments of the present disclosure can provide a data driver circuit and a display device capable of low-power driving by reducing peak current through control of a spread time of MUX stages.

Embodiments of the present disclosure can provide a data driver circuit and a display device capable of optimizing a spread time of MUX stages based on a counting result of a bit toggle count of image data.

The problems and limitations to be solved or addressed by embodiments of the present disclosure are not limited to those described above, and other problems and limitations not mentioned will be clearly understood by those skilled in the art from the description below.

Embodiments of the present disclosure can provide a display device comprising a display panel in which a plurality of gate lines, a plurality of data lines, a plurality of sub-pixels, and a demultiplexer are disposed; a data driver circuit that supplies a data voltage corresponding to image data to a plurality of data channels; and a controller that controls the data driver circuit and supplies the image data to the data driver circuit. The demultiplexer includes a plurality of MUX stages and controls connection between the plurality of data channels and the plurality of data lines through switching operations of the plurality of MUX stages, and the data driver circuit can control the length of at least one of a first spread time and a second spread time of the plurality of MUX stages based on a bit toggle count of the image data.

Embodiments of the present disclosure can provide a data driver circuit comprising: a latch circuit that receives and latches image data from a controller; a bit count circuit that counts a bit toggle count of the image data output from the latch circuit; a switching controller that controls the length of at least one of a first spread time and a second spread time of a plurality of MUX stages within a demultiplexer that controls connection between a plurality of data channels and a plurality of data lines, based on the bit toggle count; a digital-to-analog converter that converts the image data output from the latch circuit into a data voltage based on a gamma gradation voltage; and an output buffer that outputs the data voltage to the demultiplexer through the plurality of data channels.

According to embodiments of the present disclosure, a data driver circuit and a display device capable of reducing peak current and improving ground bouncing can be provided by controlling a spread time of MUX stages.

According to embodiments of the present disclosure, a data driver circuit and a display device capable of low-power driving can be provided by reducing peak current through control of a spread time of MUX stages.

According to embodiments of the present disclosure, a data driver circuit and a display device capable of optimizing a spread time of MUX stages based on a counting result of a bit toggle count of image data can be provided.

The effects of embodiments of the present disclosure are not limited to the effects described above, and other effects not mentioned will be clearly understood by those skilled in the art from the claims.

It is to be understood that both the foregoing general description and the following detailed description are exemplary and explanatory and are intended to provide further explanation of the inventive concepts as claimed.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
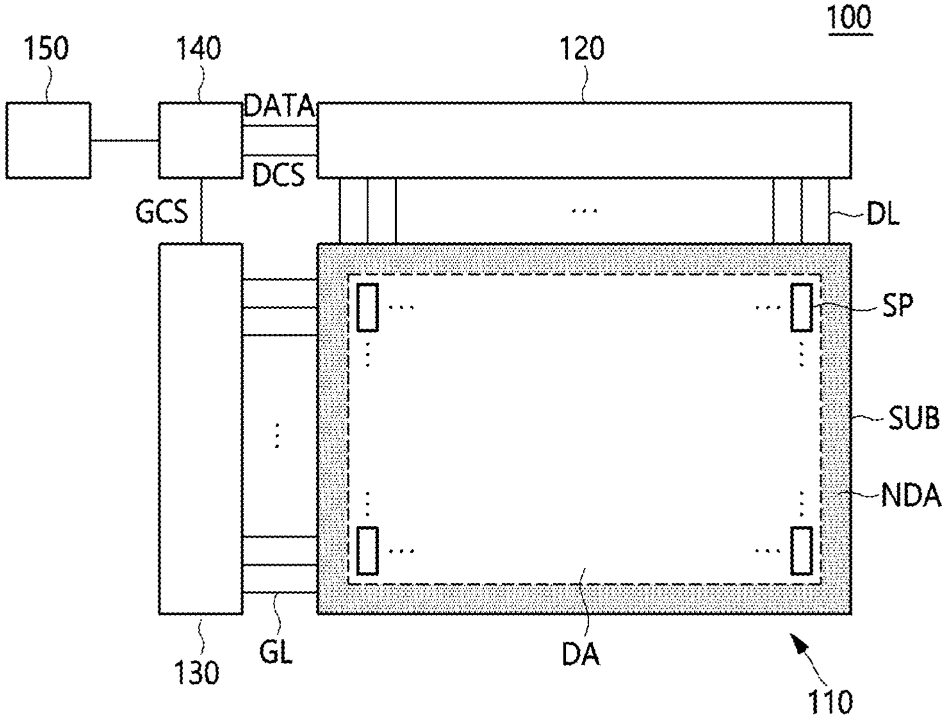
FIG. 1 is a diagram illustrating a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” can be used herein to describe elements of the present disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element can be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms can be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term “can” fully encompasses all the meanings of the term “may” and vice versa.

Any implementation described herein as an “example” is not necessarily to be construed as preferred or advantageous over other implementations.

In the description of the various embodiments of the present disclosure, where positional relationships are described, for example, when a position relation between two parts is described as, for example, “on,” “over,” “under,” and “next,” or the like, one or more other parts can be located between the two parts unless a more limiting term, such as “just” or “direct(ly)” is used. For example, where an element or layer is disposed “on” another element or layer, a third layer or element can be interposed therebetween.

The expression of a first element, a second elements “and/or” a third element should be understood as one of the first, second and third elements or as any or all combinations of the first, second and third elements. By way of example, A, B and/or C can refer to only A; only B; only C; any or some combination of A, B, and C; or all of A, B, and C.

The term “at least one” should be understood as including any and all combinations of one or more of the associated listed items. For example, the meaning of “at least one of a first element, a second element, and a third element” encompasses the combination of all three listed elements, combinations of any two of the three elements, as well as each individual element, the first element, the second element, or the third element.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term “part” or “unit” can apply, for example, to a separate circuit or structure, an integrated circuit, a computational block of a circuit device, or any structure configured to perform a described function as should be understood to one of ordinary skill in the art.

Rather, these embodiments can be provided so that this disclosure can be sufficiently thorough and complete to assist those skilled in the art to fully understand the scope of the present disclosure.

Features of various embodiments of the present disclosure can be partially or overall coupled to or combined with each other, and can be variously inter-operated with each other and driven technically as those skilled in the art can sufficiently understand. Embodiments of the present disclosure can be carried out independently from each other, or can be carried out together in co-dependent relationship.

Various embodiments of the present specification will be described in detail with reference to the accompanying drawings. All the components of each display device/apparatus according to all embodiments of the present disclosure are operatively coupled and configured.

FIG. 1 is a diagram illustrating a display device according to embodiments of the present disclosure.

Referring to FIG. 1, a display device 100 according to embodiments of the present disclosure can include a display panel 110 and a driving circuit for driving the display panel 110.

The driving circuit can include a data driver circuit 120 and a gate driver circuit 130, and can further include a controller 140 that controls the data driver circuit 120 and the gate driver circuit 130.

The display panel 110 can include a plurality of sub-pixels SP connected to a plurality of data lines DL and a plurality of gate lines GL.

The display panel 110 can include a display area DA in which images are displayed, and a non-display area NDA positioned outside the display area DA. In the display panel 110, a plurality of sub-pixels SP for displaying images can be arranged in the display area DA. In the non-display area NDA, the driving circuits 120, 130, and 140 can be electrically connected or can be mounted. A pad portion, to which an integrated circuit or printed circuit is connected, can also be disposed in the non-display area NDA.

The data driver circuit 120 can be a circuit for driving the plurality of data lines DL and can supply data signals to the plurality of data lines DL. The gate driver circuit 130 can be a circuit for driving the plurality of gate lines GL and can supply gate signals to the plurality of gate lines GL.

The controller 140 can supply a data control signal DCS to the data driver circuit 120 to control the timing of its operation. The controller 140 can also supply a gate control signal GCS to the gate driver circuit 130 to control the timing of its operation.

The controller 140 can control the initiation of a scan operation according to timing for each frame, convert input image data received from an external source (e.g., a host system 150) into a data signal format usable by the data driver circuit 120, and supply the converted image data DATA to the data driver circuit 120. The controller 140 can also control the data driving operation to be performed at an appropriate time based on the scan timing.

Specifically, the controller 140 can receive various timing signals from the outside along with the input image data, such as a vertical synchronization signal (VSYNC), a horizontal synchronization signal (HSYNC), a data enable signal (DE), and a clock signal (CLK). The controller 140 can generate various control signals, such as the data control signal DCS and the gate control signal GCS, to control the data driver circuit 120 and the gate driver circuit 130, and can output them to the respective circuits.

The controller 140 can be implemented as a separate component from the data driver circuit 120, or can be integrated with the data driver circuit 120 into a single integrated circuit.

The data driver circuit 120 can receive image data DATA from the controller 140 and supply a data voltage to the plurality of data lines DL, thereby driving the plurality of data lines DL. The data driver circuit 120 can also be referred to as a source driver circuit.

For example, the data driver circuit 120 can supply a data voltage to a plurality of data channels respectively corresponding to the plurality of data lines DL.

The data driver circuit 120 can include one or more source driver integrated circuits (SDICs).

For example, each source driver integrated circuit (SDIC) can be connected to the display panel 110 by a tape automated bonding (TAB) method, or can be connected to a bonding pad of the display panel 110 by a chip-on-glass (COG) method or a chip-on-panel (COP) method. Alternatively, the SDIC can be implemented using a chip-on-film (COF) method and connected to the display panel 110.

The gate driver circuit 130 can output a gate signal of a turn-on voltage level or a gate signal of a turn-off voltage level under control of the controller 140. The gate driver circuit 130 can sequentially supply gate signals of a turn-on voltage level to the plurality of gate lines GL, thereby sequentially driving the plurality of gate lines GL.

The gate driver circuit 130 can be connected to the display panel 110 by a tape automated bonding (TAB) method, or can be connected to a bonding pad of the display panel 110 by a chip-on-glass (COG) method or a chip-on-panel (COP) method. Alternatively, the gate driver circuit 130 can be connected to the display panel 110 by a chip-on-film (COF) method. The gate driver circuit 130 can also be formed in a non-display area NDA of the display panel 110 in a gate-in-panel (GIP) type. The gate driver circuit 130 can be disposed on a substrate SUB or connected to the substrate SUB. In other words, when the gate driver circuit 130 is of a GIP type, it can be disposed in the non-display area NDA of the substrate SUB. When the gate driver circuit 130 is of a COG or COF type, it can be connected to the substrate SUB.

For example, the substrate SUB can be a silicon substrate, which enables more precise control of the driving voltage of the driving circuit.

However, embodiments of the present disclosure are not limited thereto, and the substrate SUB can also be a glass substrate or another type of substrate commonly used in display devices.

The gate driver circuit 130 can be composed of a plurality of stages. When the gate driver circuit 130 is implemented in a gate-in-panel (GIP) type, each of the plurality of stages can be implemented using a plurality of GIP circuits.

At least one of the data driver circuit 120 and the gate driver circuit 130 can also be disposed in the display area DA. For example, at least one of the data driver circuit 120 and the gate driver circuit 130 can be disposed so as not to overlap the plurality of sub-pixels SP, or can be partially or entirely overlapped with the plurality of sub-pixels SP.

The data driver circuit 120 can convert image data DATA received from the controller 140 into data voltages in an analog form and can supply them to the plurality of data lines DL when a specific gate line GL is turned on by the gate driver circuit 130.

The data driver circuit 120 can be connected to one side (e.g., an upper side or a lower side) of the display panel 110. Depending on a driving method or panel design, the data driver circuit 120 can be connected to both sides (e.g., upper and lower sides) of the display panel 110 or to two or more of the four sides of the display panel 110.

The gate driver circuit 130 can be connected to one side (e.g., a left side or a right side) of the display panel 110. Depending on a driving method or panel design, the gate driver circuit 130 can be connected to both sides (e.g., left and right sides) of the display panel 110 or to two or more of the four sides of the display panel 110.

The controller 140 can be a timing controller commonly used in display technologies, or can be a control device that includes a timing controller and performs other control functions. Alternatively, the controller 140 can be a control device separate from the timing controller or can be a circuit included in the control device. The controller 140 can be implemented using various types of circuits or electronic components, such as an integrated circuit (IC), field programmable gate array (FPGA), application specific integrated circuit (ASIC), or a processor.

The controller 140 can be mounted on a printed circuit board or a flexible printed circuit, and can be electrically connected to the data driver circuit 120 and the gate driver circuit 130 through the printed circuit board or the flexible printed circuit.

The display device 100 according to embodiments of the present disclosure can be a display including a backlight unit such as a liquid crystal display, or can be a self-emitting display such as an organic light-emitting diode (OLED) display, a quantum dot display, or a micro light-emitting diode (micro LED) display.

In a case where the display device 100 according to embodiments of the present disclosure is an OLED display, each sub-pixel SP can include, as a light-emitting device, an organic light-emitting diode (OLED) that emits light by itself. In a case where the display device 100 is a quantum dot display, each sub-pixel SP can include, as a light-emitting device, a quantum dot made of semiconductor nanocrystals that emit light by themselves. In a case where the display device 100 is a micro LED display, each sub-pixel SP can include, as a light-emitting device, a micro LED made of an inorganic material that emits light by itself.

The display panel 110 according to embodiments of the present disclosure can have a top-emission structure or a bottom-emission structure, and in some cases, can have a dual-sided emission structure.

Meanwhile, the display device 100 according to embodiments of the present disclosure can include a plurality of MUX (multiplexer) stages on the display panel 110, and a demultiplexer that controls connection between a plurality of data channels and a plurality of data lines DL through switching operations of the plurality of MUX stages can be disposed.

In other words, the demultiplexer can provide data voltages, which are output to a plurality of channels from the data driver circuit 120, to a plurality of data lines DL through switching operations.

The data driver circuit 120 according to embodiments of the present disclosure can control a length of at least one of a first spread time and a second spread time of a plurality of MUX stages based on a bit toggle count of image data.

Figure 2:
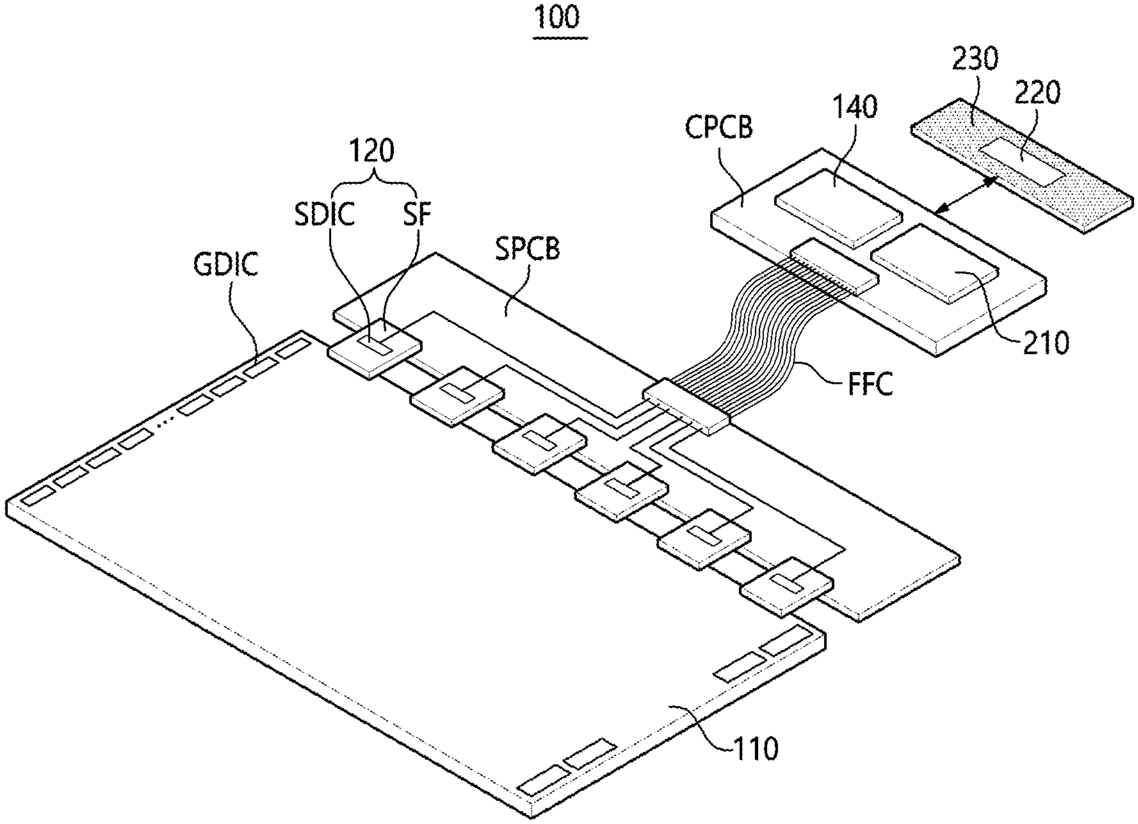
FIG. 2 is a diagram illustrating an implementation example of the display device according to embodiments of the present disclosure.

FIG. 2 is a diagram illustrating an implementation example of the display device 100 according to embodiments of the present disclosure.

Referring to FIG. 2, in the display device 100 according to embodiments of the present disclosure, the data driver circuit 120 can be implemented using a chip-on-film (COF) method selected from among various methods such as TAB, COG, and COF, and the gate driver circuit 130 can be implemented in a gate-in-panel (GIP) form selected from among various methods such as TAB, COG, COF, and GIP. However, embodiments of the present disclosure are not limited thereto.

When the gate driver circuit 130 is implemented in a GIP form, a plurality of gate driver integrated circuits (GDICs) included in the gate driver circuit 130 can be directly formed in a non-display area of the display panel 110. In this case, each GDIC can receive various signals (e.g., clock signals, gate high signals, gate low signals, etc.) required for generating scan signals through gate-driving-related signal lines formed in the non-display area.

Similarly, one or more source driver integrated circuits (SDICs) included in the data driver circuit 120 can be mounted on at least one source film (SF), and one side of the source film SF can be electrically connected to the display panel 110. In addition, on the upper portion of the source film SF, wirings for electrically connecting the SDICs and the display panel 110 can be disposed.

In the example of FIG. 2, the display device 100 is illustrated as including a plurality of source films SF and a plurality of source driver integrated circuits SDICs disposed on each of the multiple source films SF. However, embodiments of the present disclosure are not limited thereto, and the display device 100 can include a single source film SF and a single SDIC disposed thereon.

The display device 100 can include at least one source printed circuit board (SPCB) for electrically connecting at least one SDIC with other devices, and a control printed circuit board (CPCB) for mounting control components and various electrical devices.

One side of the source film SF, on which the SDIC is mounted, can be connected to the source printed circuit board SPCB. For example, the source film SF, which includes the SDIC, can be electrically connected to the display panel 110 on one side and to the SPCB on the other side.

The control printed circuit board CPCB can have the controller 140 and a power management circuit 210 mounted thereon. The controller 140 can control the operation of the data driver circuit 120 and the gate driver circuit 130. The power management circuit 210 can supply driving voltages or currents to the display panel 110, the data driver circuit 120, and the gate driver circuit 130, and can control the voltages or currents being supplied.

The at least one SPCB and the CPCB can be electrically connected through at least one connection member. The connection member can be, for example, a flexible printed circuit (FPC) or a flexible flat cable (FFC). In addition, the SPCB and the CPCB can be integrated into a single printed circuit board.

The display device 100 can further include a set board 230 electrically connected to the control printed circuit board CPCB. The set board 230 can also be referred to as a power board. The set board 230 can include a main power management circuit 220 for managing the overall power of the display device 100. The main power management circuit 220 can be linked with the power management circuit 210.

In the display device 100 configured as described above, a driving voltage can be generated by the set board 230 and delivered to the power management circuit 210 on the CPCB. The power management circuit 210 can deliver the driving voltage required for display driving or characteristic sensing to the SPCB through a flexible printed circuit FPC or a flexible flat cable FFC. The driving voltage delivered to the SPCB can be supplied, through the SDIC, to a specific sub-pixel SP in the display panel 110 to perform light emission or sensing.

In this case, each sub-pixel SP arranged in the display panel 110 of the display device 100 can include a light-emitting device and circuit elements such as a driving transistor for driving the light-emitting device.

The types and number of circuit elements constituting each sub-pixel SP can vary depending on the functions provided and the design scheme.

Figure 3:
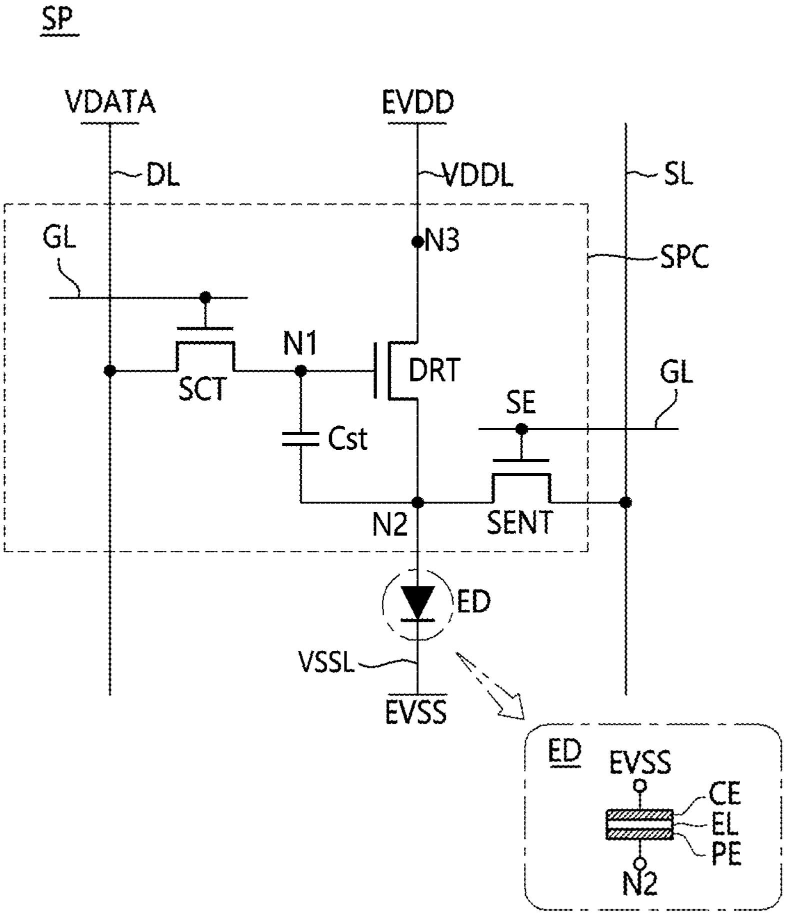
FIG. 3 is a diagram illustrating an example of a sub-pixel according to embodiments of the present disclosure.

FIG. 3 is a diagram illustrating an example of a sub-pixel SP according to embodiments of the present disclosure.

Referring to FIG. 3, a sub-pixel circuit SPC can include a driving transistor DRT for driving a light-emitting device ED, a scan transistor SCT connected to a first node N1 of the driving transistor DRT, a sensing transistor SENT connected to a second node N2 of the driving transistor DRT, and a storage capacitor Cst for maintaining a constant voltage during one frame period.

The light-emitting device ED can include a pixel electrode PE and a common electrode CE, and can further include a light-emitting layer EL located between the pixel electrode PE and the common electrode CE.

The pixel electrode PE of the light-emitting device ED can be an electrode individually disposed for each sub-pixel SP, and the common electrode CE can be an electrode commonly disposed for all sub-pixels SP.

For example, the pixel electrode PE can be an anode electrode and the common electrode CE can be a cathode electrode. Conversely, the pixel electrode PE can be a cathode electrode and the common electrode CE can be an anode electrode.

The common electrode CE of the light-emitting device ED can be connected to a low-potential voltage line VSSL that supplies a low-potential voltage EVSS.

For example, the light-emitting device ED can be an organic light-emitting diode (OLED), a light-emitting diode (LED), or a quantum dot light-emitting device.

The driving transistor DRT is a transistor for driving the light-emitting device ED and can include a first node N1, a second node N2, and a third node N3.

The first node N1 of the driving transistor DRT can be a gate node of the driving transistor DRT and can be electrically connected to a source or drain node of the scan transistor SCT.

The second node N2 of the driving transistor DRT can be a source or drain node of the driving transistor DRT and can be electrically connected to the pixel electrode PE of the light-emitting device ED.

The third node N3 of the driving transistor DRT can be a drain or source node of the driving transistor DRT and can be electrically connected to a high-potential voltage line VDDL that supplies a high-potential power voltage EVDD.

The storage capacitor Cst can be connected between the first node N1 and the second node N2 of the driving transistor DRT.

The scan transistor SCT is controlled by a gate signal and can be connected between the first node N1 of the driving transistor DRT and a data line DL.

The scan transistor SCT can be turned on by a gate signal at a turn-on voltage level supplied from a gate line GL, and can deliver a data voltage VDATA supplied from the data line DL to the first node N1 of the driving transistor DRT.

The sensing transistor SENT is controlled by a gate signal and can be connected between the second node N2 of the driving transistor DRT and a sensing line SL.

In other words, the sensing transistor SENT can be turned on by a gate signal at a turn-on voltage level supplied from a gate line GL and can control the connection between the second node N2 of the driving transistor DRT and the sensing line SL.

The sensing transistor SENT can be turned on by a gate signal at a turn-on voltage level and can deliver the reference voltage Vref supplied from the sensing line SL to the second node N2 of the driving transistor DRT.

Additionally, the sensing transistor SENT can be turned on by a gate signal at a turn-on voltage level and can deliver the voltage of the second node N2 of the driving transistor DRT to the sensing line SL.

According to the example in FIG. 3, the scan transistor SCT and the sensing transistor SENT can be connected to the same gate line GL.

On the other hand, the scan transistor SCT and the sensing transistor SENT can be connected to different gate lines GL. In this case, the scan transistor SCT can receive a scan gate signal at a turn-on voltage level from a scan gate line, which is a type of gate line GL, and the sensing transistor SENT can receive a sensing gate signal at a turn-on voltage level from a sensing gate line, which is another type of gate line GL.

Each of the driving transistor DRT, the scan transistor SCT, and the sensing transistor SENT can be an n-type transistor or a p-type transistor. In embodiments of the present disclosure, for the sake of convenience in explanation, each of the driving transistor DRT, the scan transistor SCT, and the sensing transistor SENT is illustrated as an n-type transistor.

When the scan transistor SCT and the sensing transistor SENT are n-type transistors, the turn-on voltage level of the gate signal can be a high level.

The structure of the sub-pixel SP shown in FIG. 3 is only one example, and it can be variously modified to include one or more additional transistors or one or more additional capacitors.

Figure 4:
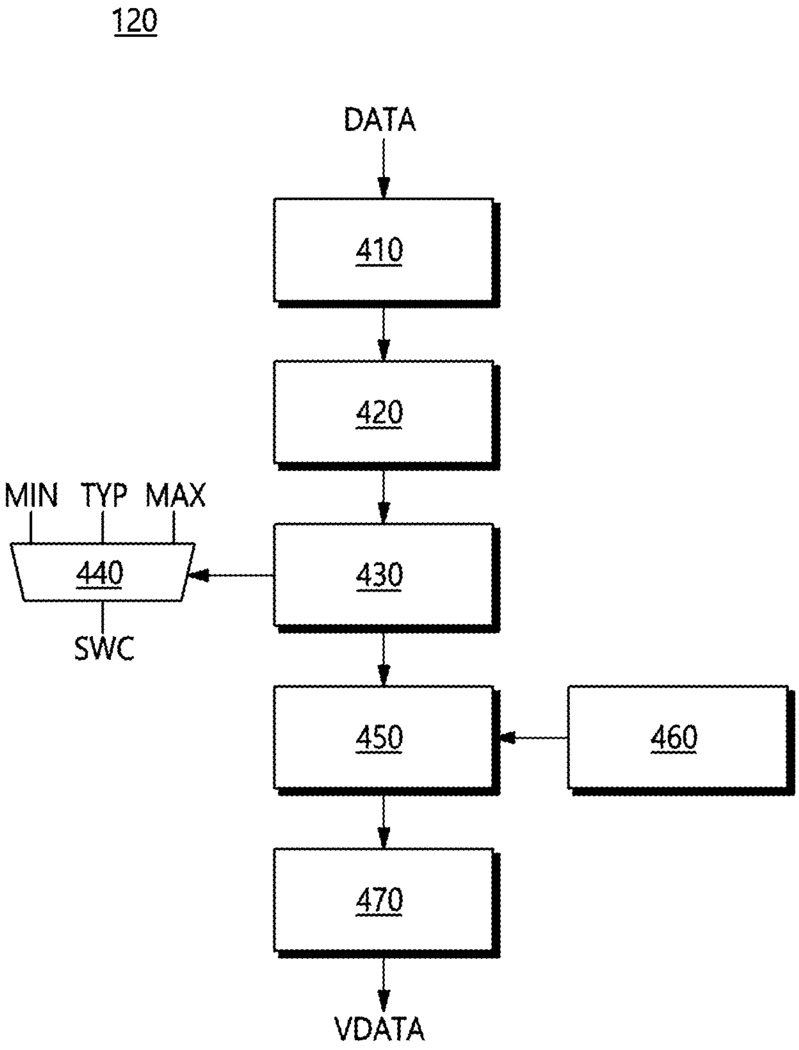
FIG. 4 is a diagram illustrating a data driver circuit according to embodiments of the present disclosure.

FIG. 4 is a diagram illustrating a data driver circuit 120 according to embodiments of the present disclosure.

Referring to FIG. 4, the data driver circuit 120 can include a shift register 410, a latch circuit 420, a bit count circuit 430, a switching controller 440, a digital-to-analog converter 450, a gamma voltage circuit 460, and an output buffer 470.

The shift register 410 can receive image data DATA from the controller 140 and provide it to the latch circuit 420.

For example, the shift register 410 can generate a latch clock signal used to control a timing at which the image data DATA is output, based on a data control signal DCS received from the controller 140, and can provide the latch clock signal to the latch circuit 420.

The latch circuit 420 can receive and latch the image data DATA from the shift register 410.

For example, the latch circuit 420 can include a first latch circuit and a second latch circuit.

The first latch circuit can latch the image data DATA received from the shift register 410 based on a latch clock signal, and can output the image data DATA latched in the first latch circuit to the second latch circuit.

The second latch circuit can latch the image data DATA received from the first latch circuit based on the latch clock signal, and can output the image data DATA latched in the second latch circuit to the bit count circuit 430.

The bit count circuit 430 can count a bit toggle count of the image data DATA output from the latch circuit 420.

Specifically, the image data DATA includes a plurality of data bit values respectively corresponding to the plurality of data lines DL, and the bit count circuit 430 can count a bit toggle count corresponding to each of n MUX stages (where n is a positive integer) included in the demultiplexer.

More specifically, the bit count circuit 430 can count a number of '1' bit values in the data bit value of a first MUX stage among the n MUX stages as a bit toggle count corresponding to the first MUX stage.

In addition, the bit count circuit 430 can count a number of changed bits between data bit values of a (k−1)th MUX stage and a kth MUX stage (where k is a positive integer satisfying $2 \le k \le n$) among the n MUX stages as a bit toggle count corresponding to the kth MUX stage.

Here, the changed bits can refer to at least one bit in which a '0' bit value in the (k−1)th MUX stage is changed to '1' in the kth MUX stage, or a '1' bit value in the (k−1)th MUX stage is changed to '0' in the kth MUX stage.

For example, the bit count circuit 430 can count the bit toggle count of the first MUX stage as '5' when the data bit value corresponding to the first MUX stage is '01111010', and can count it as '3' when the data bit value corresponding to the first MUX stage is '10011000'.

In addition, when the data bit value corresponding to the first MUX stage is '01111010' and the data bit value corresponding to the second MUX stage is '10111110', the bit count circuit 430 can count '3' (the number of changed bits between the data bit values of the first and second MUX stages) as the bit toggle count of the second MUX stage. When the data bit value corresponding to the third MUX stage is '11110011', it can count '4' (the number of changed bits between the second and third MUX stages) as the bit toggle count of the third MUX stage.

The switching controller 440 can control a switching operation of a demultiplexer that controls connection between a plurality of data channels and a plurality of data lines, based on the bit toggle count counted by the bit count circuit 430.

Specifically, the switching controller 440 can select a spread time corresponding to the bit toggle count from among a plurality of preset spread times, and can output a switching control signal SWC based on the selected spread time to a plurality of MUX stages included in the demultiplexer.

For example, the plurality of preset spread times can include at least one of a plurality of first spread times and a plurality of second spread times, where the first spread time can correspond to an activation time of a MUX stage, and the second spread time can correspond to a deactivation time of the MUX stage.

For example, the switching controller 440 can select a spread time corresponding to the bit toggle count of each of the plurality of MUX stages from among the plurality of preset spread times and can output a switching control signal SWC based on the selected spread time.

According to an embodiment, the switching controller 440 can select a spread time for at least one data channel corresponding to a preset cycle among the plurality of data channels and can output a switching control signal SWC based on the selected spread time.

For example, the switching controller 440 can select a spread time for each of at least two MUX stages connected to at least one data channel corresponding to a preset cycle among the plurality of MUX stages, and can output a switching control signal SWC based on the selected spread time.

In a more specific example, if the number of data channels is 2,304 and the preset cycle is '60', the switching controller 440 can select a spread time for each of at least two MUX stages connected to each of the 60th, 120th, . . . , and 2280th channels, and can output switching control signals SWC based on the selected spread times.

The switching controller 440 can select a spread time of a first length TYP from among the plurality of spread times when the bit toggle count of the image data DATA is equal to or greater than a first threshold value (e.g., 3) and less than a second threshold value (e.g., 6) greater than the first threshold value.

The switching controller 440 can select a spread time of a second length MIN shorter than the first length TYP from among the plurality of spread times when the bit toggle count of the image data DATA is less than the first threshold value.

The switching controller 440 can select a spread time of a third length MAX longer than the first length TYP from among the plurality of spread times when the bit toggle count of the image data DATA is equal to or greater than the second threshold value.

For example, the spread time of the first length TYP can represent a normal spread time and can be predetermined within a range of 90% to 110% of an initial spread time; the spread time of the second length MIN can represent a minimum spread time and can be predetermined within a range of 70% to 90% of the initial spread time; and the spread time of the third length MAX can represent a maximum spread time and can be predetermined within a range of 110% to 130% of the initial spread time. However, embodiments of the present disclosure are not limited thereto.

The switching controller 440 can receive an initial switching control signal for the plurality of MUX stages from the controller 140 and can generate a switching control signal SWC corresponding to each of the plurality of MUX stages by controlling an initial spread time corresponding to the initial switching control signal based on the selected spread time.

When the bit toggle count of the image data DATA is equal to or greater than the first threshold value and less than the second threshold value, and the spread time of the first length TYP is set to 100% of the initial spread time, the switching controller 440 can output the initial switching control signal received from the controller 140 as the switching control signal SWC without controlling the spread time.

For example, in the display device 100 according to embodiments of the present disclosure, the spread time of each of the plurality of MUX stages can be adaptively controlled according to the bit toggle amount of the image data DATA, so that the peak current toggled in the plurality of MUX stages can be reduced and the ground bouncing can accordingly be improved.

The digital-to-analog converter 450 can convert the image data DATA output from the latch circuit 420 into a data voltage VDATA based on a gamma gradation voltage, where the gamma gradation voltage can be supplied from the gamma voltage circuit 460.

The output buffer 470 can provide the data voltage VDATA output from the digital-to-analog converter 450 to the demultiplexer through a plurality of data channels.

For example, the output buffer 470 can be an output amplifier that amplifies the data voltage VDATA output from the digital-to-analog converter 450 and outputs it to the plurality of data channels.

Figure 5:
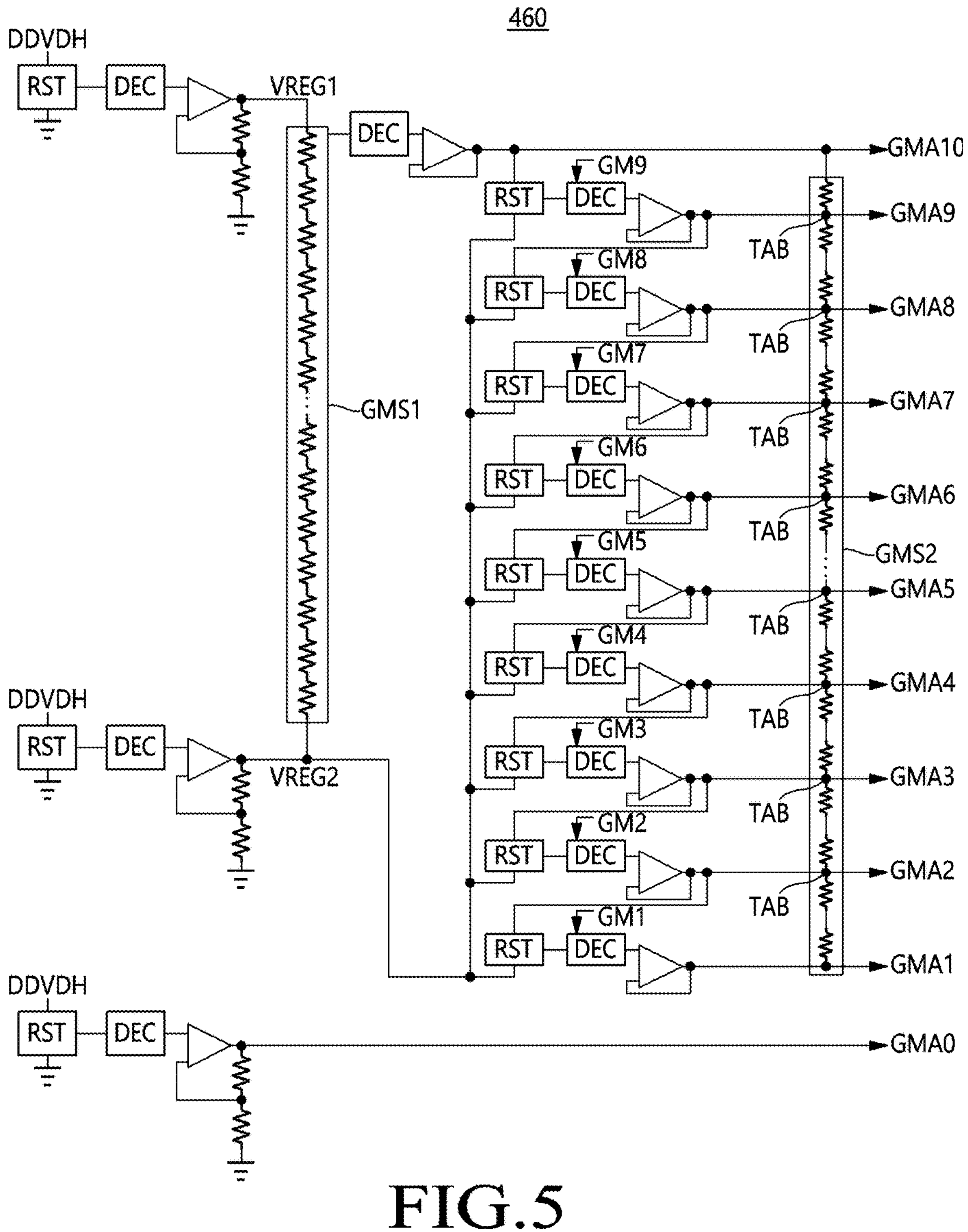
FIG. 5 is a diagram illustrating an implementation example of a gamma voltage circuit according to embodiments of the present disclosure.

FIG. 5 is a diagram illustrating an example implementation of a gamma voltage circuit 460 according to embodiments of the present disclosure.

Referring to FIG. 5, the gamma voltage circuit 460 can include a plurality of resistor strings RST, a plurality of decoders DEC, an input gamma string GMS1, an output gamma string GMS2, and a plurality of buffers.

The input gamma string GMS1 is a resistor string connected in series between a high-potential voltage VREG1 and a low-potential voltage VREG2. Each of the high-potential voltage VREG1 and the low-potential voltage VREG2 can be varied by a resistor string RST and a decoder DEC, which divide a gray-scale generation voltage DDVDH. Here, the gray-scale generation voltage DDVDH can vary according to the bit toggle count of the image data DATA.

The output gamma string GMS2 is a resistor string connected in series between a highest gamma reference voltage GMA10 and a lowest gamma reference voltage GMA1. These gamma reference voltages can be referred to as tap gamma voltages in that they represent voltages at the taps of the output gamma string GMS2.

The highest gamma reference voltage GMA10 depends on a specific voltage divided in the input gamma string GMS1. This divided voltage can be varied by the decoder. The lowest gamma reference voltage GMA1 can also be varied by the resistor string RST and the decoder DEC that divide the gray-scale generation voltage DDVDH.

The output gamma string GMS2 can include a plurality of tap gradation points. The output gamma string GMS2 can generate a plurality of gamma voltages (e.g., V0 to V255) representing voltage levels for each gradation by dividing the voltage between the gamma reference voltages at the tap gradation points TAB.

Each of the tap gradation points TAB can be connected to a resistor string RST, a decoder DEC, and a buffer. The resistor string RST can be connected between the gamma reference voltage of an adjacent upper tap gradation point TAB and the low voltage VREG2 and can divide the gamma reference voltage of the adjacent upper tap. The decoder can select a divided voltage corresponding to the gamma values GM1 to GM9 stored in the gamma register memory of the data driver and apply the selected voltage to the buffer. The buffer can buffer the divided voltage and apply it to the tap gradation points TAB.

The gamma voltages V0 to V255 generated by the gamma voltage circuit 460 can be provided to the digital-to-analog converter 450, which can convert the image data DATA from digital form to analog data voltage VDATA using the gamma voltages.

Specifically, when an image signal is supplied to a pixel, the digital signal is converted into an analog voltage suitable for the sub-pixel SP. This voltage adjustment between gradations, considering visibility, is referred to as gamma correction. Most gamma correction can be performed using a gamma voltage circuit 460 including a resistor string and a decoder.

Gamma correction can be performed through optical compensation at a specific point after the display device is driven, and the gamma values at that point can be written to the gamma register memory of the data driver. Optical compensation involves identifying decoder values that satisfy the target values of luminance or color coordinates for each decoder DEC, and values between decoders-, for example, between tap gradation voltages—can be obtained through interpolation. The decoder values can correspond to the gamma values GM1 to GM9 stored in the gamma register memory.

Figure 6:
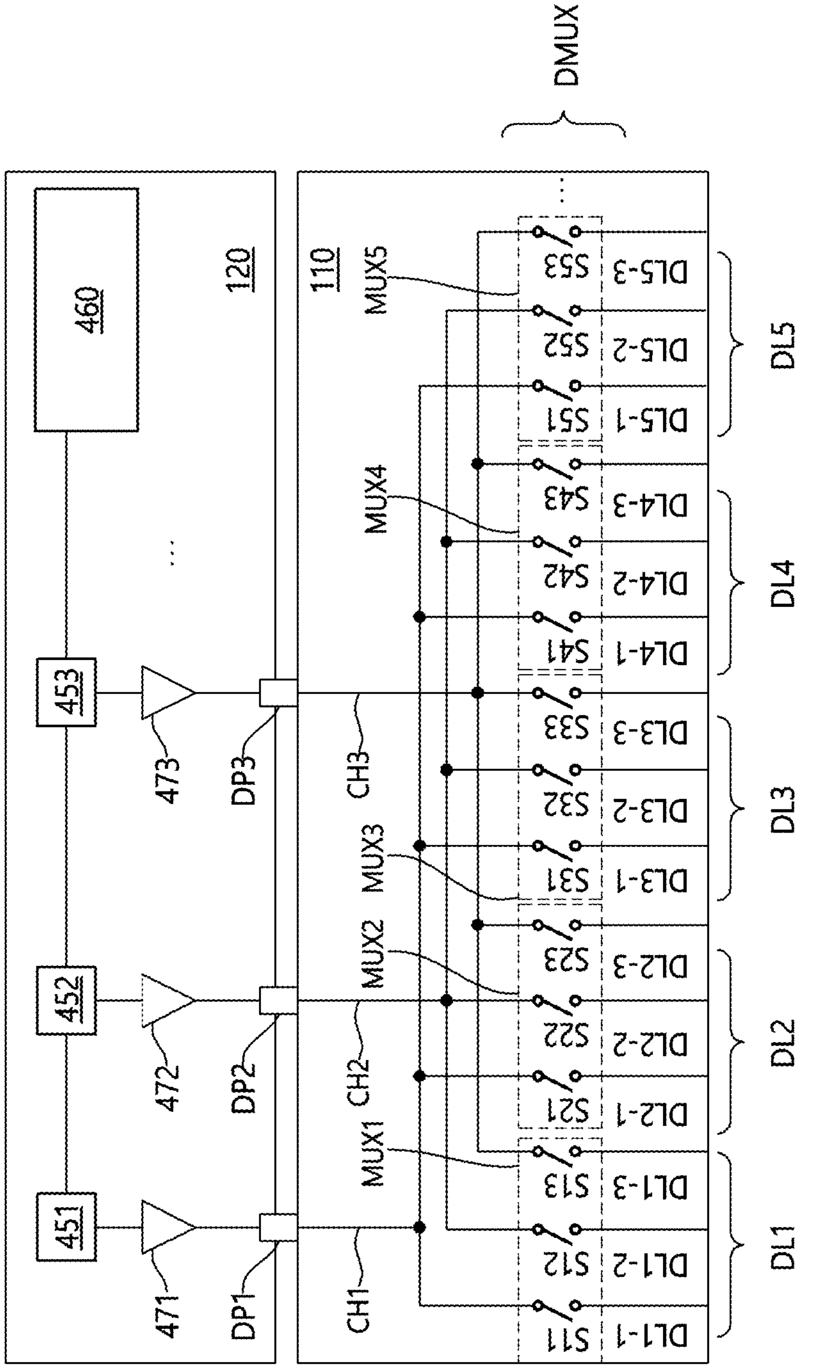
FIG. 6 is a diagram illustrating a demultiplexer included in the display device according to embodiments of the present disclosure.

FIG. 6 is a diagram illustrating a demultiplexer included in the display device 100 according to embodiments of the present disclosure.

Referring to FIG. 6, the data driver circuit 120 according to embodiments of the present disclosure can be electrically connected to a demultiplexer DMUX including a plurality of MUX stages MUX1 to MUX5 through a plurality of data channels CH1, CH2, and CH3.

The plurality of data channels CH1, CH2, and CH3 are exemplified as three channels, and the demultiplexer DMUX is illustrated as a 1-to-5 demultiplexer, but embodiments of the present disclosure are not limited thereto.

For example, when the number of data lines DL in the display panel 110 is 3,840 (RGB), and the demultiplexer DMUX is a 1-to-5 demultiplexer, the number of data channels can be 2,304.

Specifically, the plurality of data channels can include at least one first data channel CH1 corresponding to a first color, at least one second data channel CH2 corresponding to a second color, and at least one third data channel CH3 corresponding to a third color.

For example, the first color can be red, the second color can be green, and the third color can be blue. However, embodiments of the present disclosure are not limited thereto, and the plurality of data channels can further include at least one fourth data channel corresponding to a fourth color (e.g., white).

According to the example of FIG. 6, the digital-to-analog converter 450 can include a first digital-to-analog converter 451 for receiving image data DATA corresponding to the first color, a second digital-to-analog converter 452 for receiving image data corresponding to the second color, and a third digital-to-analog converter 453 for receiving image data corresponding to the third color.

The output buffer 470 can include a first output buffer 471 connected to the first digital-to-analog converter 451, a second output buffer 472 connected to the second digital-to-analog converter 452, and a third output buffer 473 connected to the third digital-to-analog converter 453.

According to the example of FIG. 6, the first output buffer 471 can be connected to the first data channel CH1 through a first data pad DP1, the second output buffer 472 can be connected to the second data channel CH2 through a second data pad DP2, and the third output buffer 473 can be connected to the third data channel CH3 through a third data pad DP3.

Each of the plurality of MUX stages MUX1 to MUX5 in the demultiplexer DMUX can electrically connect the first to third data channels CH1 to CH3 with the first to fifth data lines DL1 to DL5 through switching operations.

According to the example of FIG. 6, first MUX stage MUX1 can electrically connect data channels CH1 to CH3 to first data line DL1; second MUX stage MUX2 can electrically connect data channels CH1 to CH3 to second data line DL2; and third MUX stage MUX3 can electrically connect first to third data channels CH1 to CH3 to third data line DL3.

Fourth MUX stage MUX4 can electrically connect first to third data channels CH1 to CH3 to fourth data line DL4, and fifth MUX stage MUX5 can electrically connect first to third data channels CH1 to CH3 to fifth data line DL5.

According to the example of FIG. 6, each of the plurality of MUX stages MUX1 to MUX5 can include a first switching element (e.g., S11, S21, S31, S41, S51) connected to first data channel CH1, a second switching element (e.g., S12, S22, S32, S42, S52) connected to second data channel CH2, and a third switching element (e.g., S13, S23, S33, S43, S53) connected to third data channel CH3.

Specifically, in the first MUX stage MUX1, the first switching element S11 can control a connection between the first data channel CH1 and the first-1 data line DL1-1 among the first data line DL1 through a switching operation, the second switching element S12 can control a connection between the second data channel CH2 and the first-2 data line DL1-2 among the first data line DL1 through a switching operation, and the third switching element S13 can control a connection between the third data channel CH3 and the first-3 data line DL1-3 among the first data line DL1 through a switching operation.

In the second MUX stage MUX2, the first switching element S21 can control a connection between the first data channel CH1 and the second-1 data line DL2-1 among the second data line DL2 through a switching operation, the second switching element S22 can control a connection between the second data channel CH2 and the second-2 data line DL2-2 among the second data line DL2 through a switching operation, and the third switching element S23 can control a connection between the third data channel CH3 and the second-3 data line DL2-3 among the second data line DL2 through a switching operation.

In the third MUX stage MUX3, the first switching element S31 can control a connection between the first data channel CH1 and the third-1 data line DL3-1 among the third data line DL3 through a switching operation, the second switching element S32 can control a connection between the second data channel CH2 and the third-2 data line DL3-2 among the third data line DL3 through a switching operation, and the third switching element S33 can control a connection between the third data channel CH3 and the third-3 data line DL3-3 among the third data line DL3 through a switching operation.

In the fourth MUX stage MUX4, the first switching element S41 can control a connection between the first data channel CH1 and the fourth-1 data line DL4-1 among the fourth data line DLA through a switching operation, the second switching element S42 can control a connection between the second data channel CH2 and the fourth-2 data line DL4-2 among the fourth data line DL4 through a switching operation, and the third switching element S43 can control a connection between the third data channel CH3 and the fourth-3 data line DL4-3 among the fourth data line DLA through a switching operation.

In the fifth MUX stage MUX5, the first switching element S51 can control a connection between the first data channel CH1 and the fifth-1 data line DL5-1 among the fifth data line DL5 through a switching operation, the second switching element S52 can control a connection between the second data channel CH2 and the fifth-2 data line DL5-2 among the fifth data line DL5 through a switching operation, and the third switching element S53 can control a connection between the third data channel CH3 and the fifth-3 data line DL5-3 among the fifth data line DL5 through a switching operation.

Each of the data lines DL1-1, DL2-1, DL3-1, DL4-1, and DL5-1, which are connected to the first switching elements S11, S21, S31, S41, and S51, can be connected to sub-pixels of a first color among a plurality of sub-pixels. Each of the data lines DL1-2, DL2-2, DL3-2, DL4-2, and DL5-2, which are connected to the second switching elements S12, S22, S32, S42, and S52, can be connected to sub-pixels of a second color among the plurality of sub-pixels. Each of the data lines DL1-3, DL2-3, DL3-3, DL4-3, and DL5-3, which are connected to the third switching elements S13, S23, S33, S43, and S53, can be connected to sub-pixels of a third color among the plurality of sub-pixels.

Each of the plurality of MUX stages MUX1 to MUX5 can be connected to the switching controller 440 in the data driver circuit 120 through a different switching control line and can receive a switching control signal SWC.

For example, the first MUX stage MUX1 can be connected to the switching controller 440 through a first switching control line and receive a first switching control signal; the second MUX stage MUX2 can be connected to the switching controller 440 through a second switching control line and receive a second switching control signal; the third MUX stage MUX3 can be connected to the switching controller 440 through a third switching control line and receive a third switching control signal; the fourth MUX stage MUX4 can be connected to the switching controller 440 through a fourth switching control line and receive a fourth switching control signal; and the fifth MUX stage MUX5 can be connected to the switching controller 440 through a fifth switching control line and receive a fifth switching control signal.

The first, second, and third switching elements included in any one of the plurality of MUX stages MUX1 to MUX5 can be connected to the switching controller 440 in the data driver circuit 120 through a common switching control line and can receive the switching control signal SWC.

For example, the first to third switching elements S11, S12, and S13 included in the first MUX stage MUX1 can be connected to the switching controller 440 through the first switching control line and receive the same first switching control signal. Similarly, the switching elements S21 to S23 in the second MUX stage MUX2 can be connected through the second switching control line and receive the second switching control signal, the switching elements S31 to S33 in MUX3 can be connected through the third switching control line and receive the third switching control signal, the switching elements S41 to S43 in the fourth MUX stage MUX4 can be connected through the fourth switching control line and receive the fourth switching control signal, and the switching elements S51 to S53 in the fifth MUX stage MUX5 can be connected through the fifth switching control line and receive the fifth switching control signal.

In other words, the spread time of each of the MUX stages MUX1 to MUX5 can be individually controlled, and the spread times can be identical to each other or at least partially different.

In addition, the spread times of the first to third switching elements included in any one of the MUX stages MUX1 to MUX5 can be identical to each other.

Specifically, each of the plurality of MUX stages MUX1 to MUX5 can receive any one of the switching control signals corresponding to the spread time of the first length TYP, the spread time of the second length MIN, or the spread time of the third length MAX based on the bit toggle count corresponding to each of the plurality of MUX stages MUX1 to MUX5.

For example, when the bit toggle counts corresponding to the first MUX stage MUX1 and the third MUX stage MUX3 are within the range between the first and second threshold values, the bit toggle counts corresponding to the second MUX stage MUX2 and the fourth MUX stage MUX4 are less than the first threshold value, and the bit toggle count corresponding to the fifth MUX stage MUX5 is equal to or greater than the second threshold value, the first to third MUX stages MUX1 and MUX3 can receive the switching control signal corresponding to the spread time of the first length TYP, the second and fourth MUX stages MUX2 and MUX4 can receive the switching control signal corresponding to the spread time of the second length MIN, and the fifth MUX stage MUX5 can receive the switching control signal corresponding to the spread time of the third length MAX. The spread time of each of the plurality of MUX stages MUX1 to MUX5 can be controlled based on the switching control signal received thereby.

However, this is merely an example, and the spread times set in the display device are not limited to the above three types. For example, the spread times based on specific bit toggle count criteria can be set in four or more types.

Meanwhile, the first, second, and third switching elements included in any one of the plurality of MUX stages MUX1 to MUX5 can be connected to the switching controller 440 in the data driver circuit 120 through different switching control lines and can receive switching control signals SWC.

For example, in the first MUX stage MUX1, the first switching element S11 can be connected to the switching controller 440 through a first-1 switching control line of the first switching control line and receive a first-1 switching control signal, the second switching element S12 can be connected through a first-2 switching control line and receive a first-2 switching control signal of the first switching control line, and the third switching element S13 can be connected through a first-3 switching control line of the first switching control line and receive a first-3 switching control signal.

In the second MUX stage MUX2, the first switching element S21 can be connected to the switching controller 440 through a second-1 switching control line among the second switching control line and receive a second-1 switching control signal. The second switching element S22 can be connected to the switching controller 440 through a second-2 switching control line among the second switching control line and receive a second-2 switching control signal. The third switching element S23 can be connected to the switching controller 440 through a second-3 switching control line among the second switching control line and receive a second-3 switching control signal.

In the third MUX stage MUX3, the first switching element S31 can be connected to the switching controller 440 through a third-1 switching control line among the third switching control line and receive a third-1 switching control signal. The second switching element S32 can be connected to the switching controller 440 through a third-2 switching control line and receive a third-2 switching control signal. The third switching element S33 can be connected to the switching controller 440 through a third-3 switching control line and receive a third-3 switching control signal.

In the fourth MUX stage MUX4, the first switching element S41 can be connected to the switching controller 440 through a fourth-1 switching control line among the fourth switching control line and receive a fourth-1 switching control signal. The second switching element S42 can be connected to the switching controller 440 through a fourth-2 switching control line and receive a fourth-2 switching control signal. The third switching element S43 can be connected to the switching controller 440 through a fourth-3 switching control line and receive a fourth-3 switching control signal.

In the fifth MUX stage MUX5, the first switching element S51 can be connected to the switching controller 440 through a fifth-1 switching control line among the fifth switching control line and receive a fifth-1 switching control signal. The second switching element S52 can be connected to the switching controller 440 through a fifth-2 switching control line and receive a fifth-2 switching control signal. The third switching element S53 can be connected to the switching controller 440 through a fifth-3 switching control line and receive a fifth-3 switching control signal.

In other words, among the first to third switching elements included in any one of the plurality of MUX stages MUX1 to MUX5, the spread times of at least two switching elements can be identical or different from each other.

Specifically, each of the first to third switching elements included in any one of the plurality of MUX stages MUX1 to MUX5 can receive any one of the switching control signals corresponding to the spread time of the first length TYP, the spread time of the second length MIN, or the spread time of the third length MAX, based on the bit toggle count corresponding to each of the first to third switching elements in the corresponding MUX stage.

At least one of the first switching elements S11, S21, S31, S41, S51, the second switching elements S12, S22, S32, S42, S52, and the third switching elements S13, S23, S33, S43, S53 included in the plurality of MUX stages MUX1 to MUX5 can be a p-type transistor or an n-type transistor. Each switching element implemented as a transistor can receive a switching control signal SWC through a gate node.

Figure 7A:
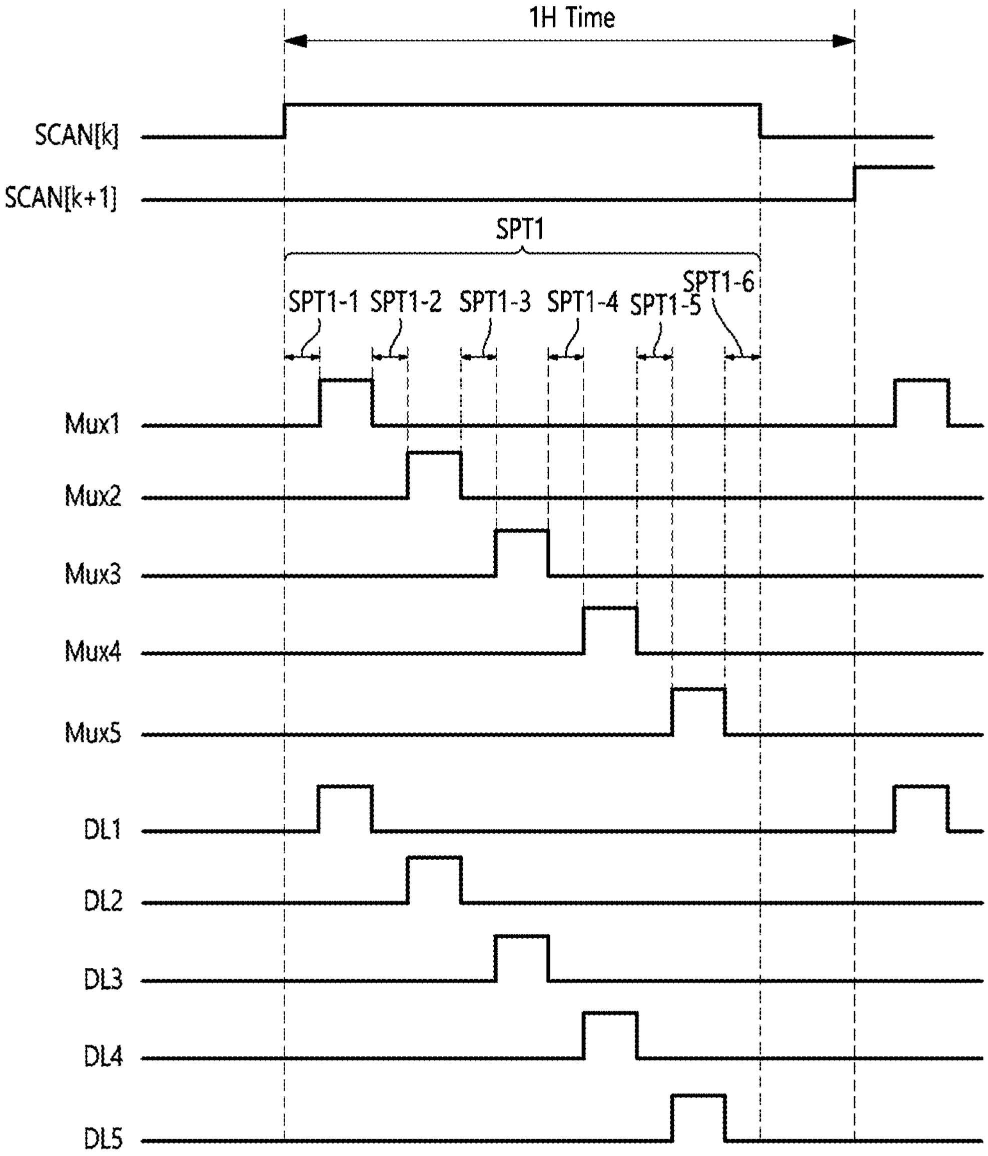
FIGS. 7A, 7B and 8 are diagrams illustrating examples of controlling a spread time in the display device according to embodiments of the present disclosure.
Figure 7B:
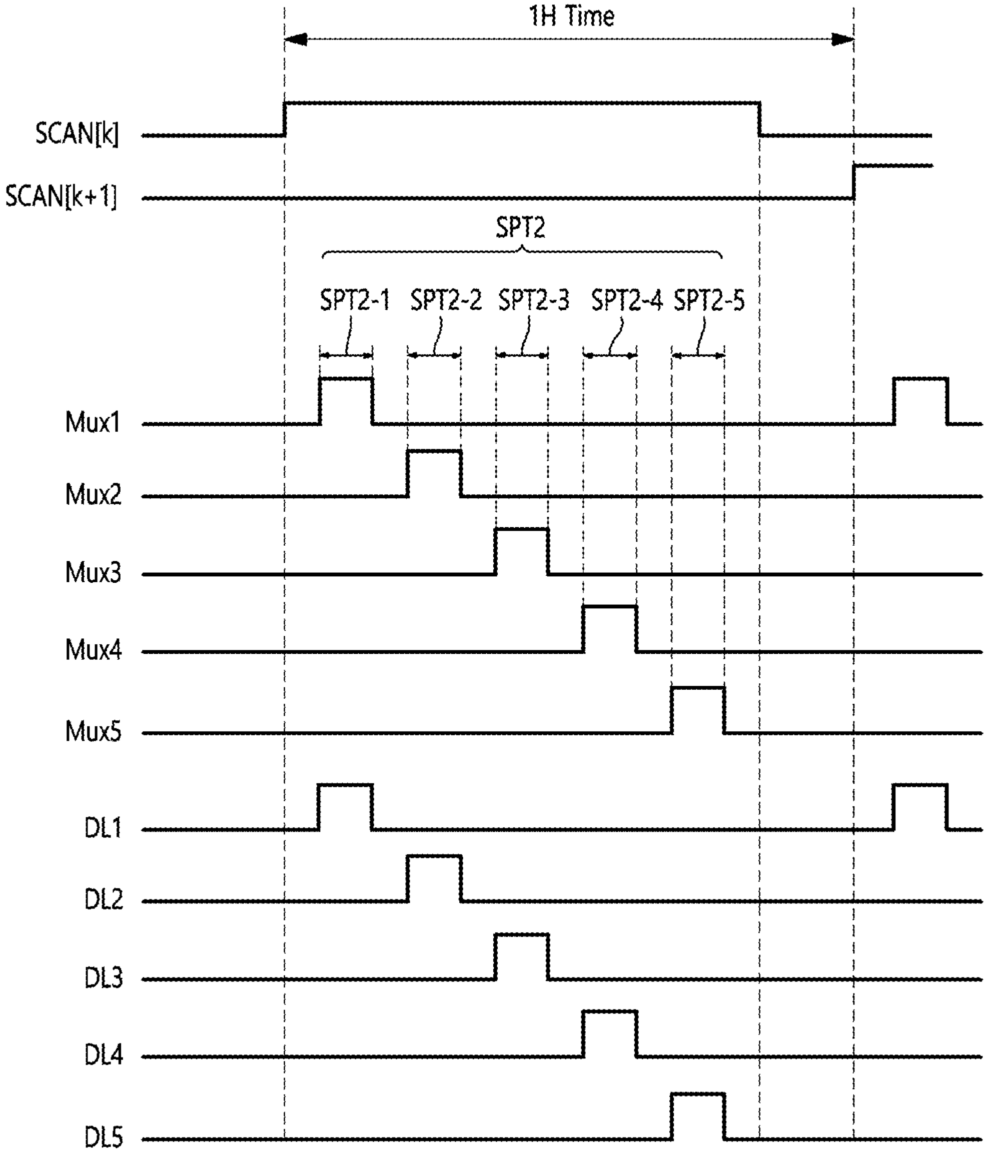
Figure 8:
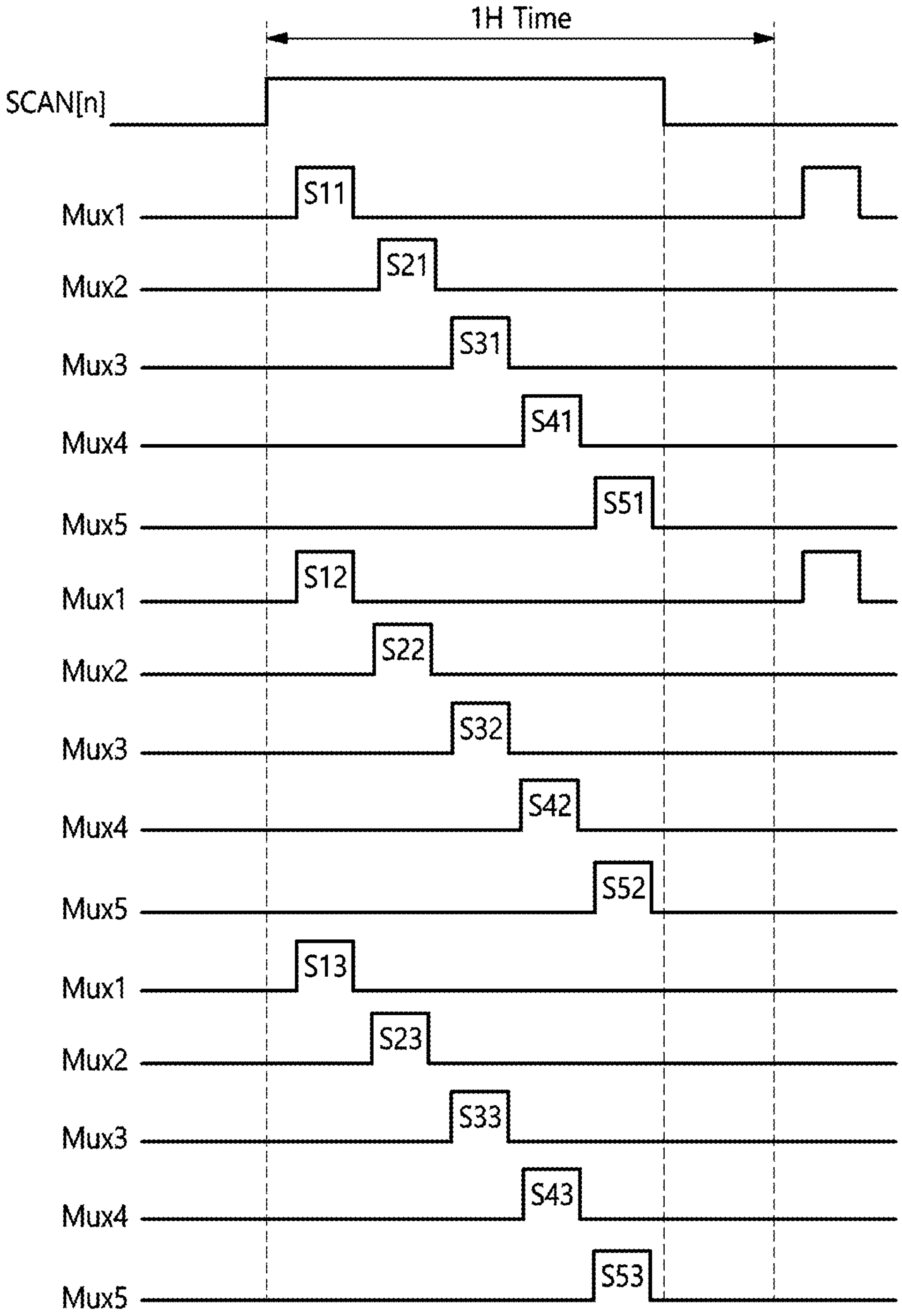

FIG. 7A to FIG. 8 are diagrams illustrating examples of controlling spread times in the display device 100 according to the embodiments of the present disclosure.

Specifically, FIG. 7A illustrates a timing diagram according to an embodiment in which a first spread time SPT1 of each of the plurality of MUX stages MUX1 to MUX5 during a single horizontal time (1H time) is controlled. FIG. 7B illustrates a timing diagram according to an embodiment in which a second spread time SPT2 of each of the plurality of MUX stages MUX1 to MUX5 during a single horizontal time is controlled. FIG. 8 illustrates a timing diagram according to switching operations of the first to third switching elements included in each of the plurality of MUX stages MUX1 to MUX5 during a single horizontal time.

Referring to FIG. 7A and FIG. 7B, each of the plurality of MUX stages MUX1 to MUX5 can have at least one of the first spread time SPT1 and the second spread time SPT2 controlled during an activation time of a scan gate signal SCAN, in which n MUX stages are sequentially activated, based on the switching control signal SWC received from the switching controller 440.

Here, the activation time of the scan gate signal SCAN can refer to a period in which the scan gate signal SCAN is at a high level.

The first spread time SPT1 can include an initial deactivation time from a start point of activation of the scan gate signal SCAN to an activation start point of a first MUX stage among the n MUX stages, at least one intermediate deactivation time between an activation end point of an (n−1)th MUX stage and an activation start point of an nth MUX stage among the n MUX stages, and a final deactivation time from an activation end point of the nth MUX stage to an end point of the scan gate signal. Here, the number of intermediate deactivation times can be (n−1).

The data driver circuit 120 can control the length of at least one of the initial deactivation time, the at least one intermediate deactivation time, and the final deactivation time.

In the example of FIG. 7A, the initial deactivation time can include a first deactivation time SPT1-1, the intermediate deactivation times can include second to fifth deactivation times SPT1-2 to SPT1-5, and the final deactivation time can include a sixth deactivation time SPT1-6.

In other words, in the example of FIG. 7A, the first spread time SPT1 can include the first deactivation time SPT1-1 from the activation start point of the scan gate signal SCAN to the activation start point of the first MUX stage MUX1, the second deactivation time SPT1-2 from the activation end point of MUX1 to the activation start point of MUX2, the third deactivation time SPT1-3 from the activation end point of MUX2 to the activation start point of MUX3, the fourth deactivation time SPT1-4 from the activation end point of MUX3 to the activation start point of MUX4, the fifth deactivation time SPT1-5 from the activation end point of MUX4 to the activation start point of MUX5, and the sixth deactivation time SPT1-6 from the activation end point of MUX5 to the end point of the scan gate signal SCAN.

For example, the length of each of the first to fifth deactivation times SPT1-1 to SPT1-5 can be equal to the length of a spread time corresponding to the bit toggle count of each of the MUX stages MUX1 to MUX5. Here, each of the spread times corresponding to the bit toggle count of the first to fifth MUX stages MUX1 to MUX5 can include at least one of a spread time of a first length TYP, a spread time of a second length MIN, and a spread time of a third length MAX.

Alternatively, the length of each of the second to sixth deactivation times SPT1-2 to SPT1-6 can be equal to the length of a spread time corresponding to the bit toggle count of each of the MUX stages MUX1 to MUX5.

The second spread time SPT2 can include n activation times respectively corresponding to the n MUX stages. The data driver circuit 120 can control the length of at least one of the n activation times.

For example, according to the example of FIG. 7B, the second spread time SPT2 can include a first activation time SPT2-1 from an activation start point to an activation end point of the first MUX stage MUX1, a second activation time SPT2-2 from an activation start point to an activation end point of the second MUX stage MUX2, a third activation time SPT2-3 from an activation start point to an activation end point of the third MUX stage MUX3, a fourth activation time SPT2-4 from an activation start point to an activation end point of the fourth MUX stage MUX4, and a fifth activation time SPT2-5 from an activation start point to an activation end point of the fifth MUX stage MUX5.

For example, the length of each of the first to fifth activation times SPT2-1 to SPT2-5 can be equal to the length of a spread time corresponding to the bit toggle count of each of MUX1 to MUX5. Here, the spread time corresponding to the bit toggle count of each of the first to fifth MUX stages MUX1 to MUX5 can include at least one of a spread time of a first length TYP, a spread time of a second length MIN, and a spread time of a third length MAX.

The switching controller 440 can provide switching control signals SWC, in which the first spread time SPT1 is controlled, to the plurality of MUX stages MUX1 to MUX5 based on the bit toggle count corresponding to each of the plurality of MUX stages MUX1 to MUX5.

For example, each switching control signal SWC supplied to each of the MUX stages MUX1 to MUX5 can be a signal that controls the first to fifth deactivation times SPT1-1 to SPT1-5 or the second to sixth deactivation times SPT1-2 to SPT1-6 to the corresponding one of the spread time of the first length TYP, the spread time of a second length MIN, and the spread time of a third length MAX.

The switching controller 440 can also provide switching control signals SWC, in which the second spread time SPT2 is controlled, to the plurality of MUX stages MUX1 to MUX5 based on the bit toggle count corresponding to each MUX stage.

For example, each switching control signal SWC supplied to each of the MUX stages MUX1 to MUX5 can be a signal that controls the first to fifth activation times SPT2-1 to SPT2-5 to the corresponding one of the spread time of the first length TYP, the spread time of a second length MIN, and the spread time of a third length MAX.

The switching controller 440 can provide switching control signals SWC, in which both the first spread time SPT1 and the second spread time SPT2 are controlled, to the plurality of MUX stages MUX1 to MUX5 based on the bit toggle count corresponding to each MUX stage.

According to the examples in FIG. 7A and FIG. 7B, when a high-level kth scan signal SCAN[k] is applied through a kth gate line (where k is a positive integer), scan transistors SCT included in at least one sub-pixel SP connected to the kth gate line can be turned on.

In addition, the first to fifth MUX stages MUX1 to MUX5 can supply a data voltage VDATA to the data lines DL1 to DL5 during the first to fifth activation times SPT2-1 to SPT2-5, according to the switching operations based on switching control signals SWC in which spread time is controlled and received from the switching controller 440. As a result, the data voltage VDATA can be delivered to a first node N1 of a driving transistor DRT included in at least one sub-pixel SP connected to the kth gate line.

According to the example in FIG. 7A, when the lengths of the first to fifth deactivation times SPT1-1 to SPT1-5 or the second to sixth deactivation times SPT1-2 to SPT1-6 are controlled based on the switching control signals SWC, the lengths of the first to fifth activation times SPT2-1 to SPT2-5 can be controlled to be the same.

According to the example in FIG. 7B, when the lengths of the first to fifth activation times SPT2-1 to SPT2-5 are controlled based on the switching control signals SWC, the lengths of the first to sixth deactivation times SPT1-1 to SPT1-6 can be controlled to be the same.

However, the embodiments of the present disclosure are not limited thereto, and both the lengths of the first to fifth deactivation times SPT1-1 to SPT1-5 or second to sixth deactivation times SPT1-2 to SPT1-6 and the first to fifth activation times SPT2-1 to SPT2-5 can be controlled simultaneously based on the switching control signals SWC.

Referring to FIG. 8, the first to fifth MUX stages MUX1 to MUX5 can receive, from the switching controller 440, switching control signals SWC in which at least one of a first spread time SPT1 and a second spread time SPT2 is controlled, based on the bit toggle count corresponding to each of the first to fifth MUX stages MUX1 to MUX5 and can control switching operations of respective first switching elements S11, S21, S31, S41, S51, second switching elements S12, S22, S32, S42, S52, and third switching elements S13, S23, S33, S43, S53 based on the switching control signals SWC.

According to the example in FIG. 8, the first to third switching elements S11, S12, and S13 included in any one of the first to fifth MUX stages MUX1 to MUX5 (e.g., MUX1) can have the first spread time SPT1 and the second spread time SPT2 controlled to be identical to each other.

However, the present disclosure is not limited thereto, and at least two of the first to third switching elements (e.g., S11, S12, S13) included in any one of the MUX stages (e.g., MUX1) can have at least one of the first spread time SPT1 and the second spread time SPT2 controlled to be different from one another.

Figure 9:
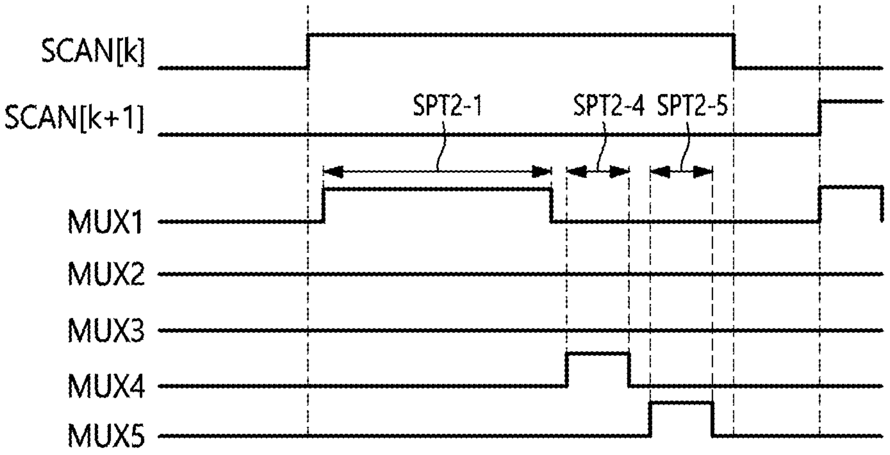
FIG. 9 to FIG. 11 are diagrams illustrating examples of controlling a spread time based on a MUX toggle count in the display device according to embodiments of the present disclosure.
Figure 10:
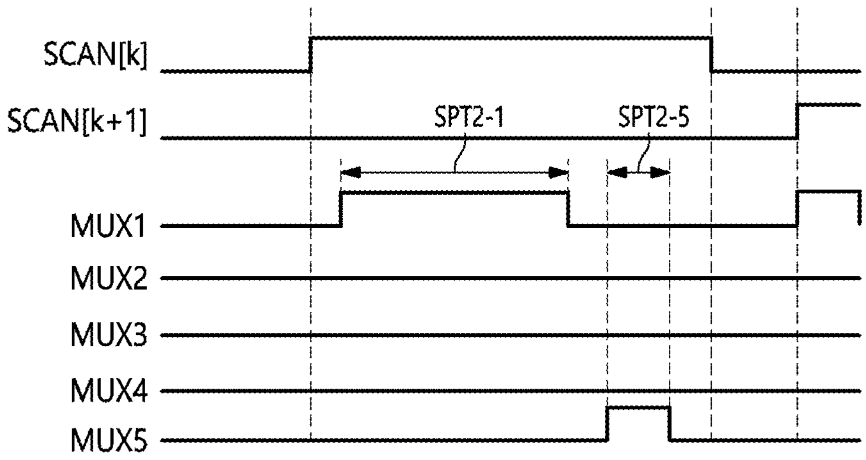
Figure 11:
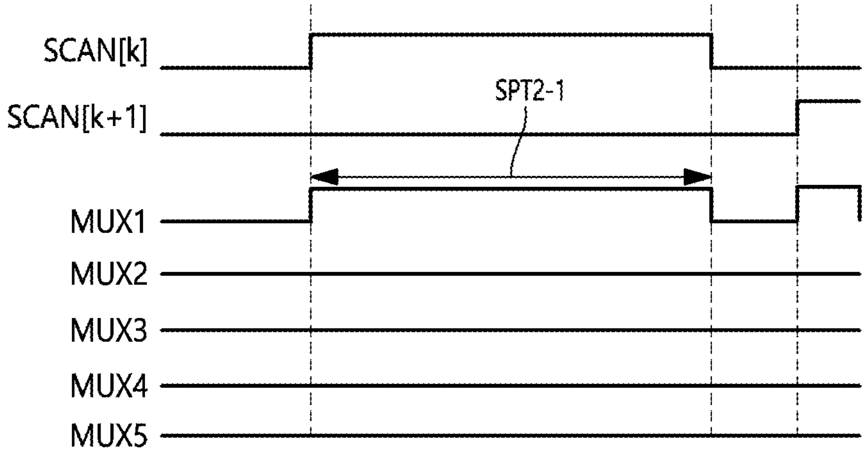

FIG. 9 to FIG. 11 are diagrams for explaining examples of controlling a spread time according to a MUX toggle count in the display device 100 according to embodiments of the present disclosure.

More specifically, FIG. 9 illustrates a timing diagram in which the second and third MUX stages MUX2 and MUX3 among the first to fifth MUX stages MUX1 to MUX5 are deactivated (i.e., MUX toggle count=3); FIG. 10 illustrates a timing diagram in which the second to fourth MUX stages MUX2 to MUX4 are deactivated (i.e., MUX toggle count=2); and FIG. 11 illustrates a timing diagram in which the second to fifth MUX stages MUX2 to MUX5 are deactivated (i.e., MUX toggle count=1).

Referring to FIG. 9 to FIG. 11, the switching controller 440 can output switching control signals SWC to control at least one of the first to fifth MUX stages MUX1 to MUX5 to be deactivated within an activation time of a scan gate signal (e.g., SCAN[k]).

In other words, the switching controller 440 can output a switching control signal SWC to control an activation time of at least one MUX stage to be "0" within the activation time of the scan gate signal (e.g., SCAN[k]).

According to the example in FIG. 9, when the image data DATA corresponding to the second and third MUX stages MUX2 and MUX3 during an activation time of a previous scan gate signal SCAN[k−1] is the same as the image data DATA corresponding to the second and third MUX stages MUX2 and MUX3 during an activation time of a current scan gate signal SCAN[k], the switching controller 440 can output a switching control signal SWC to control the second and third MUX stages MUX2 and MUX3 to be deactivated during the activation time of the current scan gate signal SCAN[k].

Even when at least one of the first to fifth MUX stages MUX1 to MUX5 is deactivated, the switching controller 440 according to the example embodiments of the present disclosure can output a switching control signal SWC in which at least one of the first spread time SPT1 and the second spread time SPT2 is controlled, thereby controlling the switching operations of each of the plurality of first to fifth MUX stages MUX1 to MUX5.

The display device 100 according to embodiments of the present disclosure can easily control the first spread time SPT1 and the second spread time SPT2 even when at least one of the first to fifth MUX stages MUX1 to MUX5 is deactivated.

The switching control signal SWC provided to each of the plurality of first to fifth MUX stages MUX1 to MUX5 can be a signal for controlling at least one of the first to sixth deactivation times SPT1-1 to SPT1-6 and the first to fifth activation times SPT2-1 to SPT2-5 corresponding to the plurality of first to fifth MUX stages MUX1 to MUX5 to a corresponding spread time among a spread time of a first length TYP, a spread time of a second length MIN, and a spread time of a third length MAX.

According to the example in FIG. 9, the switching control signal SWC provided to each of the plurality of first to fifth MUX stages MUX1 to MUX5 can control the second and third activation times SPT2-2 and SPT2-3 to be '0', so that the second and third MUX stages MUX2 and MUX3 are deactivated; control the first activation time SPT2-1 to the spread time of the third length MAX corresponding to the bit toggle count of the first MUX stage MUX1; and control the fourth and fifth activation times SPT2-4 and SPT2-5 to the spread time of the first length TYP corresponding to the bit toggle counts of the fourth and fifth MUX stages MUX4 and MUX5, respectively.

According to the example in FIG. 10, the switching control signal SWC provided to each of the plurality of first to fifth MUX stages MUX1 to MUX5 can control the second to fourth activation times SPT2-2 to SPT2-4 to be '0', so that the second to fourth MUX stages MUX2 to MUX4 are deactivated; control the first activation time SPT2-1 to the spread time of the third length MAX corresponding to the bit toggle count of the first MUX stage MUX1; and control the fifth activation time SPT2-5 to the spread time of the first length TYP corresponding to the bit toggle count of the fifth MUX stage MUX5.

According to the example in FIG. 11, the switching control signal SWC provided to each of the plurality of first to fifth MUX stages MUX1 to MUX5 can control the second to fifth activation times SPT2-2 to SPT2-5 to be '0', so that the second to fifth MUX stages MUX2 to MUX5 are deactivated, and control the first activation time SPT2-1 to the spread time of the third length MAX corresponding to the bit toggle count of the first MUX stage MUX1.

However, the timing diagrams in FIG. 9 to FIG. 11 are merely examples, and the example embodiments of the present disclosure are not limited thereto. The length of the spread time (e.g., TYP, MIN, MAX) corresponding to each of the deactivation times SPT1-1 to SPT1-6 and activation times SPT2-1 to SPT2-5 can be predetermined based on at least one of the bit toggle count of each of the first to fifth MUX stages MUX1 to MUX5, the number of deactivated MUX stages, and the positions of the deactivated MUX stages.

The display device according to the example embodiments of the present disclosure can be described as follows.

The display device according to the example embodiments of the present disclosure can include a display panel in which a plurality of gate lines, a plurality of data lines, a plurality of sub-pixels, and a demultiplexer are disposed; a data driver circuit that supplies a data voltage corresponding to image data to a plurality of data channels; and a controller that controls the data driver circuit and supplies the image data to the data driver circuit. The demultiplexer can include a plurality of MUX stages and can control connection between the plurality of data channels and the plurality of data lines through switching operations of the MUX stages. The data driver circuit can control a length of at least one of a first spread time and a second spread time of the MUX stages based on a bit toggle count of the image data.

The data driver circuit can select a spread time corresponding to the bit toggle count from among a plurality of preset spread times for the plurality of MUX stages and can output a switching control signal based on the selected spread time to the MUX stages.

The data driver circuit can receive initial switching control signals for the MUX stages from the controller and can generate switching control signals by controlling initial spread times corresponding to the initial switching control signals based on the selected spread time.

The first spread time can include an initial deactivation time from an activation start point of a scan gate signal to an activation start point of a first MUX stage among n MUX stages (where n is a positive integer) that are sequentially activated during an activation time of the scan gate signal; at least one intermediate deactivation time between an activation start point of an (n−1)th MUX stage and an activation end point of an nth MUX stage among the n MUX stages; and a final deactivation time from an activation end point of the nth MUX stage to an end point of the scan gate signal.

The data driver circuit can control a length of at least one of the initial deactivation time, the at least one intermediate deactivation time, and the final deactivation time.

The second spread time can include n activation times respectively corresponding to the n MUX stages sequentially activated during the activation time of the scan gate signal.

The data driver circuit can control a length of at least one of the n activation times.

When the bit toggle count of the image data is equal to or greater than a first threshold value and less than a second threshold value greater than the first threshold value, the data driver circuit can select a first spread time having a first length. When the bit toggle count is less than the first threshold value, it can select a second spread time shorter than the first spread time. When the bit toggle count is equal to or greater than the second threshold value, it can select a third spread time longer than the first spread time.

The image data can include a plurality of data bit values respectively corresponding to the plurality of data lines.

A bit toggle count of a kth MUX stage (where k is a positive integer satisfying $2 \le k \le n$) among the n MUX stages can correspond to the number of changed bits between data bit values of a (k−1)th MUX stage and the kth MUX stage.

A bit toggle count of the first MUX stage among the n MUX stages can be the number of '1' bit values in the data bit value of the first MUX stage.

The data channels can include at least one first data channel corresponding to a first color, at least one second data channel corresponding to a second color, and at least one third data channel corresponding to a third color.

Each of the plurality of MUX stages can include a first switching element connected to a corresponding first data channel among the at least one first data channel, a second switching element connected to a corresponding second data channel among the at least one second data channel, and a third switching element connected to a corresponding third data channel among the at least one third data channel.

The first, second, and third switching elements included in any one of the plurality of MUX stages can be connected to the data driver circuit through a common switching control line and can receive the switching control signal.

The first, second, and third switching elements included in any one of the plurality of MUX stages can be connected to the data driver circuit through different switching control lines and can receive the switching control signals.

Each of the MUX stages can be connected to the data driver circuit through a different switching control line and can receive the switching control signal.

The data driver circuit can control at least one MUX stage among the plurality of MUX stages to be deactivated during the activation time of the scan gate signal.

The plurality of MUX stages can include at least one switching element implemented as a p-type transistor or an n-type transistor.

The data driver circuit according to embodiments of the present disclosure can include: a latch circuit that receives image data from a controller and latches the image data; a bit count circuit that counts a bit toggle count of the image data output from the latch circuit; a switching controller that controls a length of at least one of a first spread time and a second spread time of a plurality of MUX stages within a demultiplexer that controls a connection between a plurality of data channels and a plurality of data lines, based on the bit toggle count; a digital-to-analog converter that converts the image data output from the latch circuit into a data voltage based on a gamma gradation voltage; and an output buffer that outputs the data voltage to the demultiplexer through the plurality of data channels.

The switching controller can select a spread time corresponding to the bit toggle count from among a plurality of preset spread times and can output a switching control signal based on the selected spread time to the plurality of MUX stages included in the demultiplexer.

The above description has been presented to enable any person skilled in the art to make and use the technical idea of the present invention, and has been provided in the context of a particular application and its requirements. Various modifications, additions, and substitutions to the described embodiments will be readily apparent to those skilled in the art, and the general principles defined herein can be applied to other embodiments and applications without departing from the spirit and scope of the present invention. The above description and the accompanying drawings provide an example of the technical idea of the present invention for illustrative purposes only. For example, the disclosed embodiments are intended to illustrate the scope of the technical idea of the present invention.

What is claimed is:

1. A display device comprising:

a display panel including a plurality of gate lines, a plurality of data lines, a plurality of sub-pixels, and a demultiplexer;

a data driver circuit that supplies a data voltage corresponding to image data to a plurality of data channels; and a controller that controls the data driver circuit and supplies the image data to the data driver circuit, wherein the demultiplexer includes a plurality of multiplexer (MUX) stages and controls connection between the plurality of data channels and the plurality of data lines through switching operations of the plurality of MUX stages, and wherein the data driver circuit controls a length of at least one of a plurality of preset spread times for MUX stages based on a bit toggle count of the image data.

2. The display device according to claim 1, wherein the data driver circuit selects a spread time corresponding to the bit toggle count from among the plurality of preset spread times, and outputs a switching control signal based on the selected spread time to the plurality of MUX stages.

3. The display device according to claim 2, wherein the data driver circuit receives an initial switching control signal for the plurality of MUX stages from the controller, and generates the switching control signal by controlling an initial spread time corresponding to the initial switching control signal in accordance with the selected spread time.

4. The display device according to claim 1, wherein the plurality of preset spread times comprises a first spread time which comprises:

an initial deactivation time from a start point of activation of a scan gate signal to an activation start point of a first MUX stage among n MUX stages that are sequentially activated during the activation time of the scan gate signal, where n is a positive integer;

at least one intermediate deactivation time between an activation end point of an (n−1)th MUX stage and an activation start point of an nth MUX stage, among the n MUX stages; and a final deactivation time from an activation end point of the nth MUX stage to an end point of the scan gate signal, and wherein the data driver circuit controls a length of at least one of the initial deactivation time, the at least one intermediate deactivation time, and the final deactivation time.

5. The display device according to claim 1, wherein the plurality of preset spread times comprises a second spread time which comprises n activation times respectively corresponding to n MUX stages that are sequentially activated during an activation time of a scan gate signal, where n is a positive integer, and wherein the data driver circuit controls a length of at least one of the n activation times.

6. The display device according to claim 2, wherein when a bit toggle count of the image data is equal to or greater than a first threshold value and less than a second threshold value being greater than the first threshold value, the data driver circuit selects a spread time having a first length from among the plurality of preset spread times.

7. The display device according to claim 6, wherein when the bit toggle count of the image data is less than the first threshold value, the data driver circuit selects a spread time of a second length, which is shorter than the first length, from among the plurality of preset spread times, and wherein when the bit toggle count of the image data is equal to or greater than the second threshold value, the data driver circuit selects a spread time of a third length being longer than the first length among the plurality of preset spread times.

8. The display device according to claim 1, wherein the image data comprises a plurality of data bit values respectively corresponding to the plurality of data lines, and wherein the bit toggle count of a kth MUX stage among the n MUX stages corresponds to a number of toggled bits between data bit values of a (k−1)th MUX stage and the kth MUX stage, where n is a positive integer and k is a positive integer satisfying $2 \le k \le n$.

9. The display device according to claim 8, wherein the bit toggle count of a first MUX stage among the n MUX stages is the number of '1' bit values in the data bit value of the first MUX stage.

10. The display device according to claim 2, wherein the plurality of data channels comprises at least one first data channel corresponding to a first color, at least one second data channel corresponding to a second color, and at least one third data channel corresponding to a third color, and wherein each of the plurality of MUX stages comprises:

a first switching element connected to a corresponding first data channel among the at least one first data channel;

a second switching element connected to a corresponding second data channel among the at least one second data channel; and a third switching element connected to a corresponding third data channel among the at least one third data channel.

11. The display device according to claim 10, wherein the first, second, and third switching elements included in one of the plurality of MUX stages are connected to the data driver circuit through a common switching control line, and receive the switching control signal.

12. The display device according to claim 10, wherein the first, second, and third switching elements included in one of the plurality of MUX stages are connected to the data driver circuit through different switching control lines, and receive the switching control signal.

13. The display device according to claim 1, wherein each of the plurality of MUX stages is connected to the data driver circuit through a different switching control line and receives the switching control signal.

14. The display device according to claim 1, wherein the data driver circuit controls at least one MUX stage among the plurality of MUX stages to be deactivated during the activation time of a scan gate signal.

15. The display device according to claim 1, wherein the plurality of MUX stages comprises at least one switching element of a p-type transistor and an n-type transistor.

16. A data driver circuit comprising:

a latch circuit that receives and latches image data from a controller;

a bit count circuit that counts a bit toggle count of the image data output from the latch circuit;

a switching controller that controls a length of at least one of a plurality of preset spread times for a plurality of multiplexer (MUX) stages within a demultiplexer that controls connection between a plurality of data channels and a plurality of data lines, based on the bit toggle count;

a digital-to-analog converter that converts the image data output from the latch circuit into a data voltage based on a gamma gradation voltage; and an output buffer that outputs the data voltage to the demultiplexer through the plurality of data channels.

17. The data driver circuit according to claim 16, wherein the switching controller selects a spread time corresponding to the bit toggle count from among the plurality of preset spread times, and outputs a switching control signal based on the selected spread time to the plurality of MUX stages.

18. A display device comprising:

the data driver circuit of claim 16 and configured to supply the data voltage corresponding to the image data to the plurality of data channels;

a display panel including a plurality of gate lines, the plurality of data lines, a plurality of sub-pixels, and the demultiplexer; and the controller configured to control the data driver circuit and supply the image data to the data driver circuit.

* * * * *